United States Patent [19]

Hosaka et al.

[11] Patent Number: 4,532,594

[45] Date of Patent: Jul. 30, 1985

[54] MULTIPLE MICROCOMPUTER SYSTEM WITH COMONITORING/BACK-UP FOR AN AUTOMOTIVE VEHICLE

[75] Inventors: Akio Hosaka; Akito Yamamoto, both of Yokohama; Katsunori Oshiage, Yokosuka, all of Japan

[73] Assignee: Nissan Motor Company, Limited, Yokohama, Japan

[21] Appl. No.: 396,658

[22] Filed: Jul. 9, 1982

[30] Foreign Application Priority Data

Jul. 13, 1981 [JP] Japan ................. 56-108091

[51] Int. Cl.³ ............... G05B 9/02; F02D 28/00; G06F 11/20
[52] U.S. Cl. ................. 364/431.11; 364/187; 371/9; 371/11
[58] Field of Search ........... 364/431.11, 187; 371/8, 371/9, 10, 61, 62; 73/119 A

[56] References Cited

U.S. PATENT DOCUMENTS

| | | | |
|---|---|---|---|
| 3,636,331 | 1/1972 | Amrehn | 371/9 |
| 3,786,433 | 1/1974 | Notley et al. | 371/9 |
| 3,803,568 | 4/1974 | Higashide | 371/61 |
| 4,153,198 | 5/1979 | Eki et al. | 371/9 |
| 4,251,873 | 2/1981 | Joby | 371/9 |
| 4,358,823 | 11/1982 | McDonald et al. | 371/9 |
| 4,363,092 | 12/1982 | Abo et al. | 364/200 |
| 4,386,427 | 5/1983 | Hosaka et al. | 371/11 |

FOREIGN PATENT DOCUMENTS

| | | | |
|---|---|---|---|
| 145809 | 1/1981 | German Democratic Rep. | 371/9 |
| 52-5233 | 1/1977 | Japan | 371/9 |
| 2044485 | 10/1980 | United Kingdom | 364/551 |

OTHER PUBLICATIONS

Dirac: Synchronous Multiprocessing Foil Detection, IBM Techn. Discl. Bull., vol. 7, Aug. 3, 1964, pp. 218/219.

Zeitschrift: "Mot-Auto-Journal", No. 6, 1979, *Computer Beherrschen das Auto,* pp. 94, 96, 97, 100 and 102.

*Primary Examiner*—Felix D. Gruber
*Attorney, Agent, or Firm*—Schwartz, Jeffery, Schwaab, Mack, Blumenthal & Evans

[57] ABSTRACT

An electronic control system for an automotive vehicle including an engine control system for controlling the engine operation using a microcomputer and a vehicle driving information system for preparing and displaying various driving information using another microcomputer, wherein a back up program is assembled into each microcomputer for backing up at least the critical jobs of the partner microcomputer when the partner fails so as to ensure continuing, safe operation of the vehicle.

8 Claims, 10 Drawing Figures

MULTIPLE MICROCOMPUTER SYSTEM WITH COMONITORING/BACK-UP FOR AN AUTOMOTIVE VEHICLE

BACKGROUND OF THE INVENTION

Field of the Invention

The present invention relates to a centralized electronic control system for an automotive vehicle having an engine control system using a microcomputer which controls engine operation and a vehicle driving condition information system using another microcomputer which informs a vehicle occupant of the changing conditions of various appliances of the vehicle, wherein one microcomputer system monitors the other microcomputer system to check whether or not the partner system is operating normally, and backs up the partner system when the partner system is not operating normally. Both microcomputers are provided with auxiliary control sections, in addition to their normal control programs, in order to perform at least some of the functions of the partner system in case of malfunction thereof.

SUMMARY OF THE INVENTION

It is an object of the present invention to provide an electronic control system for an automotive vehicle having an engine control system which controls engine operation by means of a microcomputer and a vehicle driving information indicating system which measures and displays various vehicle driving information by means of another microcomputer, wherein a back-up program is assembled into each microcomputer so as to back up main functions that the partner system provides upon detection of malfunction in the partner system, these main functions being the minimum requirements for the vehicle to continue running safely.

BRIEF DESCRIPTION OF THE DRAWINGS

The features and advantages of the present invention will be appreciated from the following description and drawings attached in which the like reference numerals designate corresponding elements and in which:

FIGS. 2(A) and (B) show the overall system configuration of an engine control system associated with the engine shown in FIG. 1;

DETAILED DESCRIPTION OF THE PREFERRED EMBODIMENTS

Reference will be made hereinafter to the attached drawings.

Figure 1:
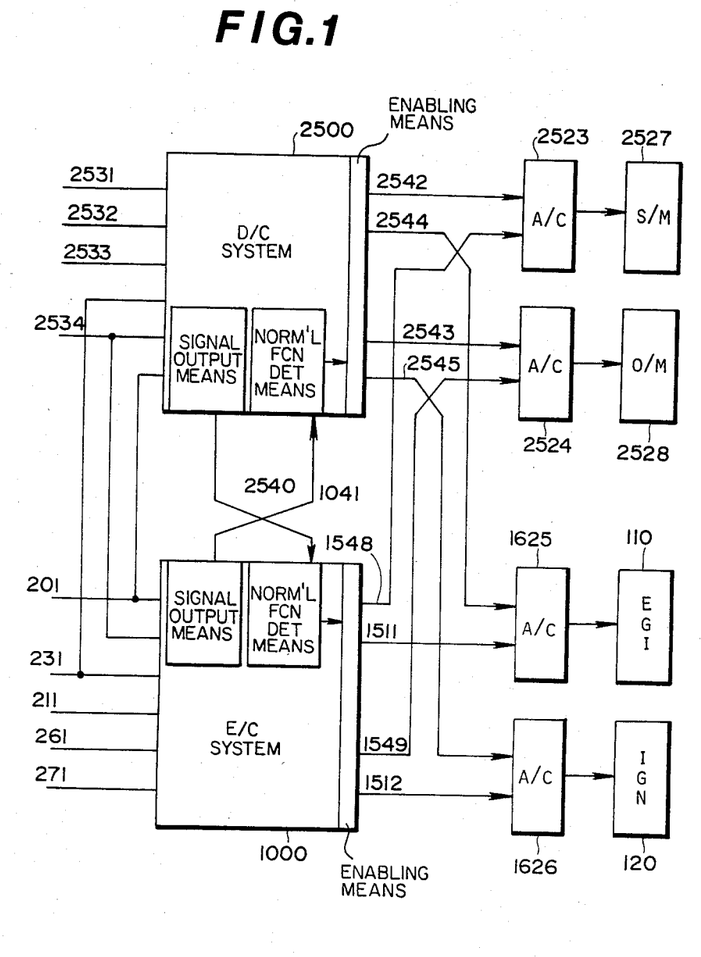
FIG. 1 is a simplified block diagram of the control system mounted in the automotive vehicle including two microcomputers performing separate functions according to the present invention.

First, FIG. 1 shows a simplified block diagram of a dual microcomputer system with comonitoring and back-up facility for an automotive vehicle according to the present invention.

In FIG. 1, numeral 1000 denotes a control system for an internal combustion engine (hereinafter abbreviated as E/C), wherein settings for ignition timing, fuel injection, and exhaust gas recirculation are controlled by a microcomputer in a time-sharing mode in response to various conditions of the engine sensed during its operation, thereby maximizing energy conversion efficiency, fuel economy, and torque and minimizing the emission of noxious pollutants from the engine. Numeral 2500 denotes an information indication system (hereinafter abbreviated as D/C) for indicating various vehicle driving conditions on a display in the instrument panel. In addition, there may be many other systems using microcomputers, e.g., an automatic temperature control system for an air conditioner of the vehicle, a control system for tuning and selecting waves from broadcasting stations, and various (vocal) warning systems (not shown in FIG. 1). These systems will be used with increasing frequency in automotive vehicles in the near future.

The D/C system 2500 receives various input signals 2531, 2532, 2533, and 2534 indicative of vehicle conditions to be described in more detail later. Some of the input signals, e.g., the vehicle speed signal 2534, are also inputted to the E/C system 1000. On the other hand, the E/C 1000 receives various input signals 201, 211, 231, 261, and 271 and some of these input signals, e.g., engine speed signal (REF) 201, coolant water temperature signal (Tw) 231, etc., are also inputted into the D/C system 2500. Numeral 2527 denotes the speed meter (S/M) in a display unit 2510. Numeral 2528 denotes the odometer (O/M) in a display unit 2510. Numerals 2523, and 2524 denote actuating circuits for the speed meter S/M 2527, and odometer (O/M) 2528, respectively. Numeral 110 denotes fuel injection control circuitry (EGI) associated with fuel injection valves and numeral 120 denotes ignition control circuitry (IGN) associated with an ignition coil. Numerals 1625 and 1626 denote respective actuating circuits for the fuel injection control and ignition control circuitry 110 and 120. Numerals 2542 through 2545, 1511, 1512, 1548, and 1549 denote actuation signals for S/M 2527, O/M 2528, EGI 110, and IGN 120.

The E/C 1000 and D/C 2500 have substantially the same configuration, i.e., an I/O interface, central processing unit (CPU), read-only memory (ROM), and random-access memory (RAM). The reason that the E/C and DC 1000 and 2500 do not use a single microcomputer for a general purpose of control and display over the vehicle but rather use two separate microcomputers for the individual purposes is that if the systems were integrated, the scale of the circuitry would be enlarged due to the greater range of calculation and processing capabilities that would be required. Therefore, the cost performance, mountability and reliability of the integrated microcomputer system would be reduced. The reason is described hereinafter in more detail.

(1) If all the functions were centralized, the number of input/output signal lines would be increased. In this case, the increase in connector cable size would cause an increase in the force applied to the I/O connectors of the microcomputer and might result in deformation and defective contact of the I/O connectors with the microcomputer. Furthermore, noise is transmitted between the I/O signal lines so that an erroneous operation thereof would be more likely to occur.

(2) If the number of circuit components is increased, the failure rate is increased accordingly. If the systems were integrated within a single microcomputer, the failure of a single circuit component would effect the other circuit components, resulting in the failure of the entire integrated microcomputer. In the case when the systems use separate microcomputers, such a failure would result in the failure of only one of the microcomputer systems.

(3) Since the number of pins in each I/O connector would be increased, the entire system would take up more space. This would be disadvantageous in terms of installation of the microcomputer at the most efficient position in accordance with the system functions. Therefore, the mountability would be reduced.

(4) Although centralized system would be generally less expensive than its localized counterpart, centralization (or integration) becomes technically difficult when the degree of centralization exceeds a certain limit and special manufacturing techniques would be required for the manufacture of the IC's. Therefore, the yield would be degraded and consequently the manufacturing cost would rapidly increase.

(5) Although a microcomputer can handle a plurality of jobs (functions) in a time-sharing mode, the average interval of execution time from one routine to a subsequent routine becomes shorter as the number of jobs increases. If the average interval of time becomes shorter than that required to perform a particular job, either (a) the jobs must be distributed or (b) the system processing speed must be increased. The latter case is technically more difficult because of the inherent characteristics of the hardware and will be expensive even if it can be realized.

(6) The specification of the E/C and D/C vary depending on the kind of automotive vehicle and internal combustion engine. Both systems may change simultaneously or may change independently of each other because of the complete separation of function. For example, if the E/C has three specifications and the D/C has four specifications, the centralized system will have twelve specifications (3×4=12). It is generally cost effective in terms of hardware to construct a single integral system. However, it is more expensive in terms of software to construct an integrated system since the logical requirements are multiplied. Therefore, it is disadvantageous due to the need to facilitate specification modifications to centralize the E/C and D/C systems. Thus, the E/C and D/C systems use separate microcomputers so as to operate independently of each other.

FIG. 1 will be discussed in greater detail later.

Figure 2:
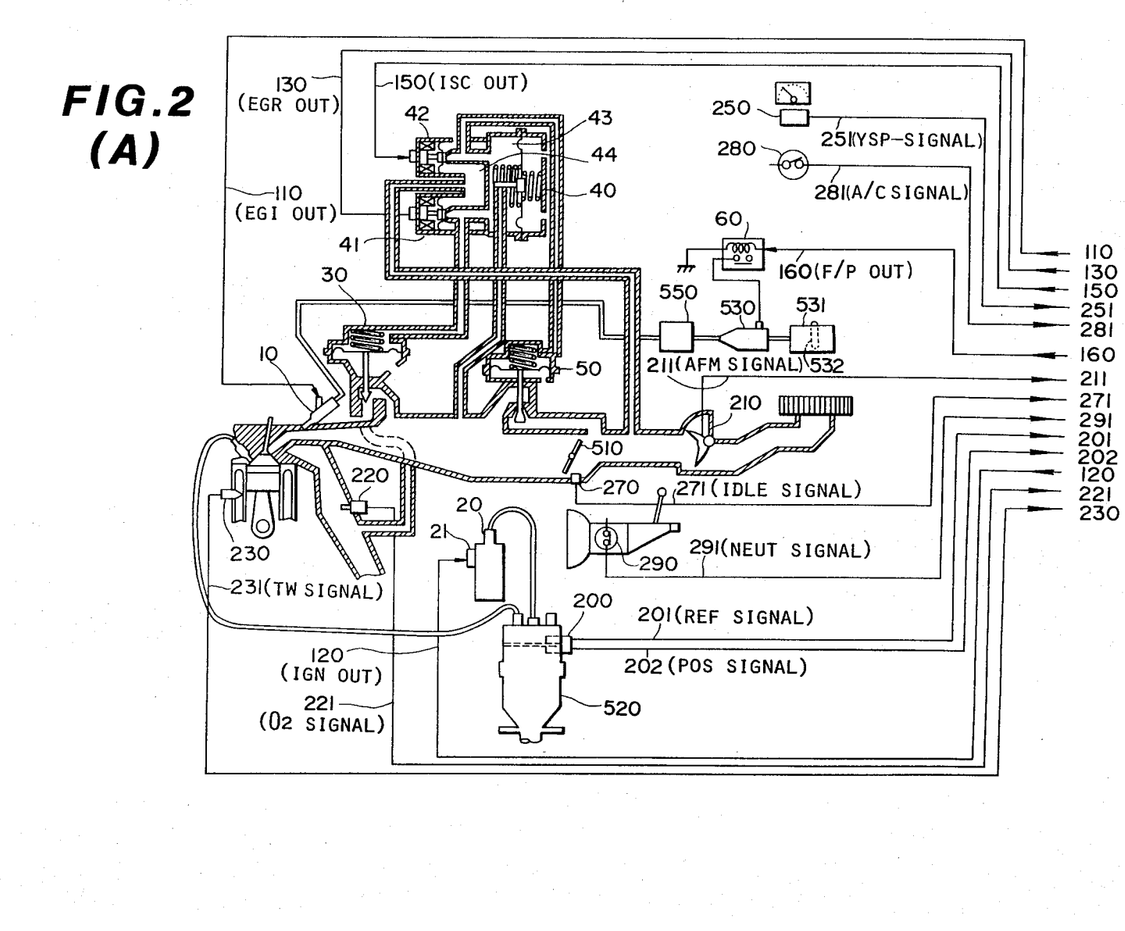
Figure 2B:
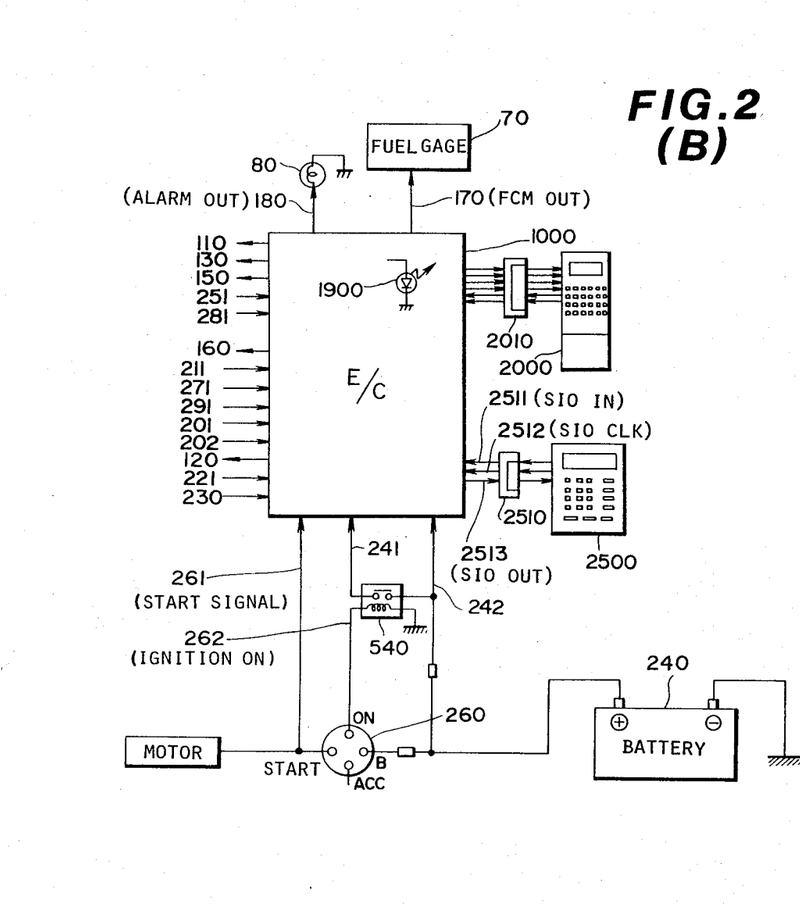

The system configuration of the E/C system 1000 is illustrated in FIGS. 2(A), and 2(B).

The E/C system is applied to a four-cycle, six-cylinder engine. The engine operating parameter control signals include:

(1) a fuel injection rate control signal 110 for controlling an opening interval and start timing for which injection valves 10 in each engine cylinder are opened in order to inject fuel into the engine;

(2) an ignition control signal 120 (IGN) for controlling the intermittent current flow through a primary winding 21 of the ignition coil 20;

(3) an exhaust gas recirculation control signal 130 (EGR) for controlling the position of an EGR valve 30 by means of a regulated vacuum pressure via a vacuum control modulation (VCM) valve 40; and (4) an engine idling rotational speed control signal 150 (ISC) for controlling the position of an AAC valve (Auxiliary Air Control Valve) 50 by means of a regulated vacuum pressure via a vacuum control modulation (VCM) valve 40 so as to regulate the air flow through an auxiliary passage bypassing a throttle valve 510.

Figure 3:
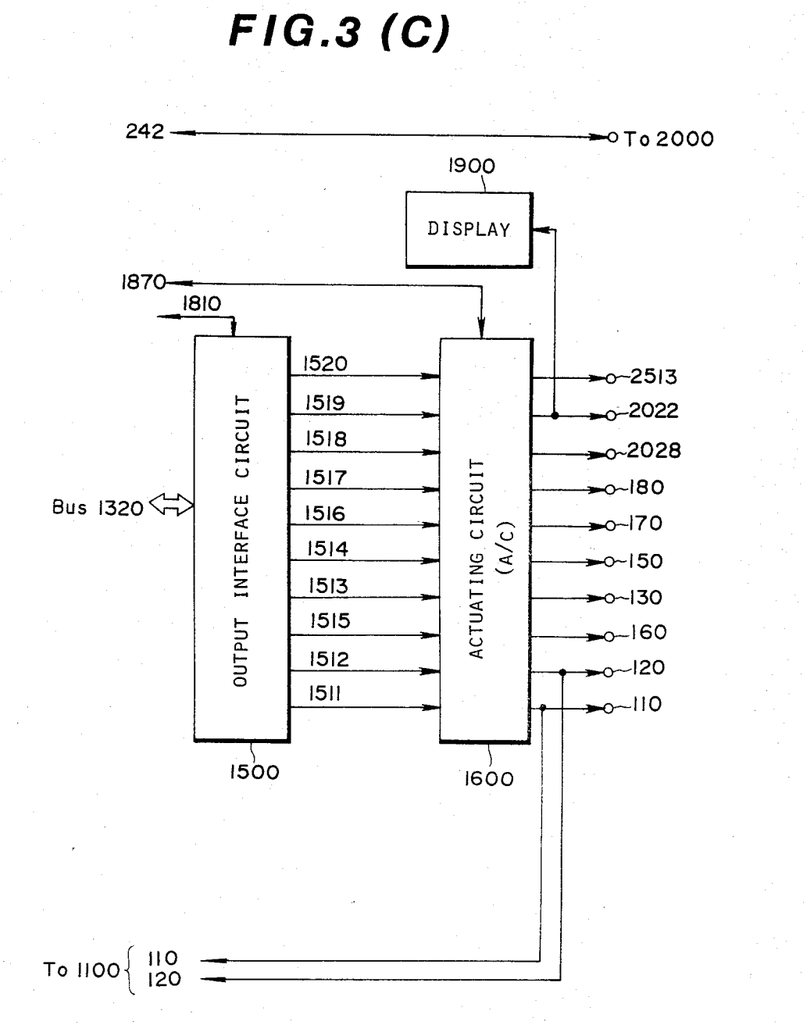
FIGS. 3(A), 3(B), and 3(C) form a simplified block diagram of the internal configuration of a control unit 1000 shown in FIG. 2(B)

(5) an on-and-off control signal 160 (F/P) for controlling a fuel pump 530 via a fuel pump relay 60;

(6) an output 170 (FCM) representing fuel consumption data for a fuel consumption gage 70;

(7) self-diagnosis of the E/C system and data exchange (CHECK) with a checker 2000 and vehicle driving information system, i.e., D/C 2500, respectively;

(8) an output 180 (ALARM) to alarm lamp 80 according to the results of self-diagnosis;

(9) a display signal (see FIG. 3(C)) (MONITOR) of the diagnostic result on a display 1900.

The input data of the E/C system 1000 listed hereinbelow are received from various portions of the vehicle as follows:

(1) a REF signal 201 which goes high whenever the engine rotates through a 120° and is produced by a crank angle sensor 200, e.g., installed within a distributor 520 which detects the rotation of the crankshaft of the engine;

(2) A POS signal 202 which has a pulsewidth corresponding to a 1° of the crankshaft rotation;

(3) an intake airflow rate sensor (AFM) signal 211 from an air flow meter 210 which detects the rate of air flow Qa into the engine (the air flow rate Qa is inversely proportional to the voltage level of the AFM signal);

(4) an oxygen concentration ($O_2$) signal 221 generated by an oxygen sensor 220, which varies depending on the oxygen concentration within the exhaust gas;

(5) a voltage signal (Tw) 231 representing the temperature of the engine from a water temperature sensor 230;

(6) DC supply voltage 242 to be supplied to both control systems from a vehicle battery 240;

(7) a battery voltage signal 241 ($V_B$) via relay 540 which reflects variations in battery supply voltage for use in correcting fuel injection rate (it should be noted that since the ON terminal of the ignition switch 260 also receives the battery voltage when the ignition switch is in the START position, the battery voltage supply 241 is supplied to the control unit 1000 during engine cranking);

(8) a vehicle speed signal (VSP) 251 having a period in proportion to the vehicle speed;

(9) an engine start signal (START) 261 which informs the control unit 1000 of engine cranking when the ignition start 260 is turned to the START position so as to start the engine;

(10) An on/off (IDLE) signal 271 which detects the closing/opening of a throttle valve switch 270 adjacent to the throttle valve 510;

(11) an air conditioner power-on signal (A/C) 281 which informs the control unit 1000 that the air conditioner is in operation; and (12) a neutral switch signal (NEUT) 291 from a neutral switch 290 which is closed when a gear lever of a transmission in a neutral position or parking position.

Figure 3A:
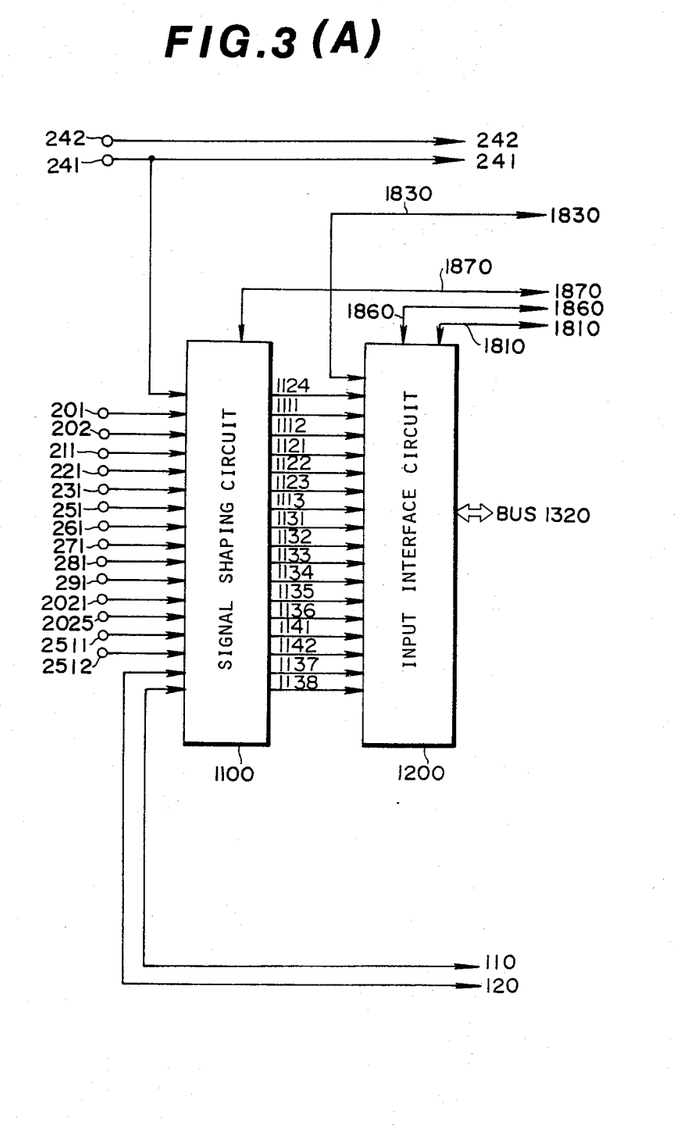
Figure 3B:
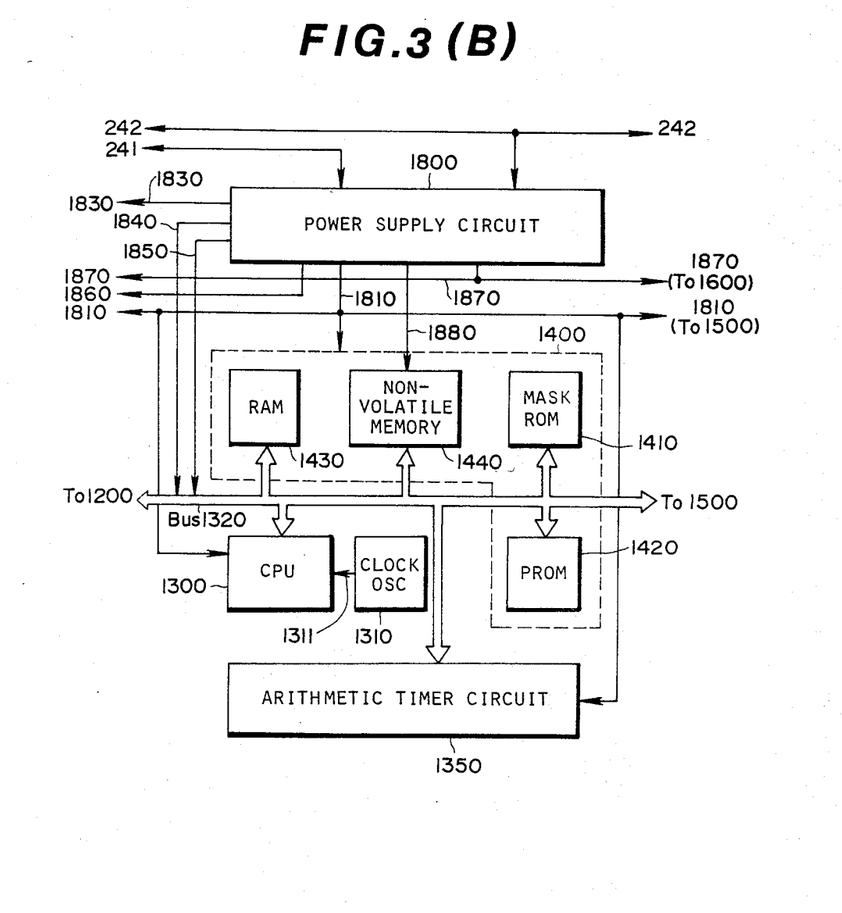

FIGS. 3(A), 3(B), and 9(C) show the internal circuit configuration of the control unit (E/C) 1000.

In FIG. 3(A), numeral 1100 denotes a signal shaping circuit which receives various input signals from the engine and from various vehicle elements and shapes these input signal waveforms so as to attenuate noise components and damp surges in these input signals, thereby protecting the control unit 1000 from erroneous operation and destruction and to amplify and convert various input signals for correct operation of an input interface circuit 1200. The input interface circuit 1200 converts various input signals shaped by the signal shaping circuit 1100 into digital bit signals and counts the number of pulses thereof for a predetermined period of time so that bit-coded signals (bit-parallel, byte-serial) are produced and temporarily stored within one of the registers provided therewithin. The CPU 1300 operates in synchronization with a clock signal based on an oscillation signal 1311 from a quartz oscillator 1310 and is connected to the other circuit blocks via a common Bus 1320. The program stored within a mask ROM 1410 and programmable ROM 1420 of a memory unit 1400 is executed so as to read input data from each register, perform specified arithmetic operations on the basis of the input data, and send out the output data at a specified timing. The memory unit 1400 is used for storing the data comprising the mask ROM 1410, programmable ROM 1420, random access memory RAM 1430, and auxiliary memory 1440. The mask ROM 1410 is manufactured with a series of program steps assembled thereinto to be executed by the CPU 1300 and permanent data to be used when the CPU 1300 executes the program. Programs and data similar to that stored in the mask ROM 1410 are held in the programmable ROM 1420 which is easier to modify according to the kind of vehicle and engine. The RAM 1430 is a memory device which can temporarily hold intermediate data from the CPU 1300 during arithmetic operations or result data to be sent out at an output interface circuit 1500. The contents of the RAM 1430 is volatile and erased when the ignition switch 260 is turned off and the main power supply 241 is interrupted. The contents of auxiliary memory unit 1440 is nonvolatile and not erased even when the ignition switch 260 is turned off, i.e., the engine is not operating.

Numeral 1350 denotes an arithmetic timer circuit which reinforces the function of the CPU 1300 having a multiplying circuit for high-speed arithmetic processing, an interval timer which sends an interrupt signal to the CPU 1300 to interrupt the program being executed whenever a predetermined interval of time has passed, and a free-running counter for indicating to the CPU 1300 the elapsed time from a predetermined event to a subsequent event and of the time of occurrence of an event. The output interface circuit 1500 receives the output data from the CPU 1300 at one of the output registers provided therewithin, produces a pulse signal having a predetermined frequency and duty cycle in response to the output value from the CPU 1300, and sends a command signal to an actuating circuitry 1600 in a form of a binary switching signal. The actuating circuit 1600 comprises a power amplifier which amplifies voltage or current upon receipt of the output interface circuit 1500, drives various actuators and displays, diagnoses the control unit 1000 via the connector 2010, and sends an output signal to the checker 2000 for displaying the diagnostic result.

Numeral 1800 denotes a power supply circuit which supplies a constant voltage (Vcc) of five volts to the input interface circuit 1200, central processing unit 1300, memory unit 1400, output interface circuit 1500, and arithmetic timer circuit 1350. The power supply circuit 1800 also distributes an ignition switch on/off (IGNSW) signal 1830 into the input interface circuit 1200, reset signal ($\overline{RESET}$) 1840 into the Bus 1320, half signal ($\overline{HALT}$) 1850 which stops the operation of the CPU 1300, a constant eight-volt (AVcc) signal 1860 for A/D conversion, and a constant voltage ($V_{ADD}$) 1870 for the signal shaping circuit 1100 and actuating circuitry 1600. The power supply circuit 1800 also supplies a constant five-volt voltage ($V_{DM}$) 1880 to the auxiliary memory unit 1440.

Figure 4:
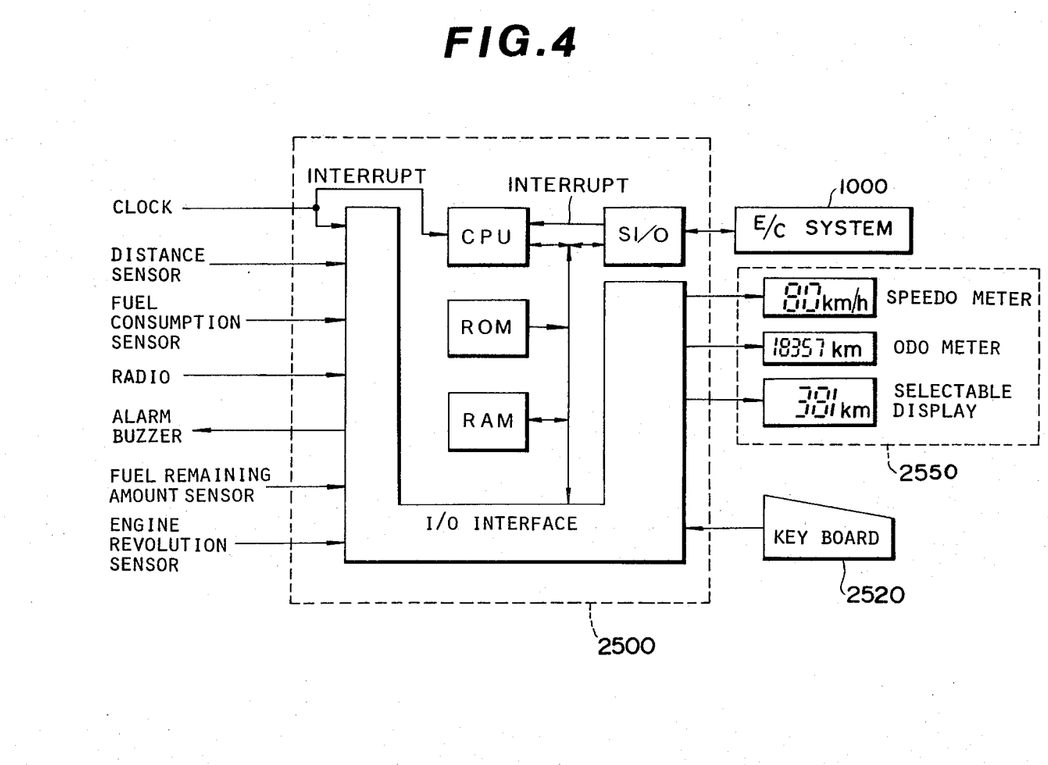
FIG. 4 is a simplified block diagram of an internal configuration of a vehicle driving information indicating system 2500 shown in FIG. 1.

Next, FIG. 4 is a system block diagram of the D/C system 2500.

The D/C system 2500 inputs a plurality of vehicle driving data from various sensors installed separately within the vehicle, arithmetically calculates such basic vehicle data to obtain necessary vehicle driving information, displays the measured result on a display unit 2550 having a switchable display and an exclusive display. The D/C system 2500 also performs a radio automatic selection of a broadcasting station, alarm control using an alarm function.

In FIG. 4, numeral 2520 denotes an input unit through which an operator can input additional information about the particular vehicle into the D/C 2500, comprising, e.g., a keyboard. The input unit 2520 can also be connected to the E/C 1000 or other devices.

The D/C 2500 shown by FIG. 4 has the following functions:

(1) Radio broadcasting program scheduling ... the input unit 2520 inputs a desired time and broadcasting station into the D/C 2500, the D/C 2500 compares the contents of stored time with the present time (inputted from a clock) and outputs a control command signal to the radio (including the POWER ON signal) so as to turn on the radio and select the desired station when the two times match. The display unit 2550 has a clock display which displays stored time and broadcasting station in units of hour and minutes and in unit of kHz.

(2) Alarm ... with the desired time stored in the same form as described in (1), a buzzing sound is produced when the time is up, i.e., when the present time agrees with the stored time. The display unit 2550 can display the stored time of the alarm in response to a command by the CPU to the D/C system 2500.

(3) Trip meter ... The total distance that the vehicle has travelled is measured on the basis of the output of a vehicle running distance sensor. The display unit 2550 can be switched to display the distance of a single current trip. The measurement of the trip distance is started when a clear switch of the keyboard 2520 is pushed.

(4) Navigation meter ... When average vehicle speed Vs is entered through the keyboard 2520, the distance of travel D from the trip meter and elapsed time T over the current trip are measured so that an actual average vehicle speed (D/T), the difference between the estimated elapsed time based on estimate Vs and the elapsed time T of the current trip (D/Vs−T), the difference between the actual distance of the current trip D from the estimated distance of travel (D−Vs/T) are distinguishably displayed through the display unit 2550.

(5) Fuel consumption . . . Fuel quantity consumed during the current trip is displayed on the screen. The measurement of the fuel consumption is started when the clear switch on the keyboard is pushed.

(6) A fuel consumption rate metering . . . A fuel efficiency value indicating the fuel consumption with respect to the trip distance is periodically calculated and displayed.

(7) Speedometer . . . The vehicle speed is measured and displayed periodically on an exclusive display within the display unit 2550.

(8) Odometer . . . The total distance the vehicle has travelled is measured and displayed on an exclusive display which is standard, original equipment in all automotive vehicles. The measured result cannot be reset.

(9) Vehicle range . . . The remaining fuel in the fuel tank is measured and multiplied by the fuel consumption rate described in (6) to produce an estimate of the distance the vehicle could travel on the remaining fuel.

(10) Tachometer . . . The number of engine revolutions per unit of time is measured and displayed on the display unit 2550.

(11) Others . . . Arbitrary numbers can be stored and displayed on a memo pad and addition, subtraction, multiplication, and division can be performed as a electronic calculator.

Various auxiliary and input devices of D/C system 2500 are listed hereinbelow.

(1) Clock . . . A source of clock signals which also outputs current time data in a serial pulse train.

(2) Distance Sensor . . . A sensor which outputs one pulse whenever the vehicle travels a predetermined distance. The pulse is obtained by an electromagnet which rotates according to the rotation of a drive shaft.

(3) Fuel consumption sensor . . . The fuel consumption sensor outputs a pulse whenever a predetermined amount of fuel is consumed in the engine. In other words, a pulse is outputted whenever the total amount of injected fuel obtained by summing the injection time of the fuel injection valves in the EGI control section of the E/C system 1000 arrives at a predetermined value.

(4) Radio equipment (Electronic tuner type) . . . A radio system wherein a power switch, an AM/FM switch, and an automatic tuning circuit are enabled by means of external electrical signals.

(5) Alarm Buzzer . . . Standard equipment.

(6) Remaining fuel amount sensor . . . An ordinary fuel gage (described hereinafter).

(7) Engine revolution sensor . . . The engine revolutions per time can be detected through ignition pulses or a crankshaft rotation sensors.

(8) Display unit 2550 . . . The vehicle speed meter is a three-digit digital display for exclusively exhibiting the current vehicle speed, having three 7-segment display elements of dynamic drive type. The odometer is a seven-digit digital display for exclusively exhibiting the total distance of travel, having seven 7-segment display elements of dynamic drive type. The switchable display can exhibit various current data (1) through (6), (9), and (10) listed hereinabove with different unit display elements, e.g., hour, Km, etc.

(9) Keyboard (input unit) 2520 . . . A push-button pads with keys for both display commands and data input. The main feature of the present invention is that within a digital multiple microcomputer system for an automotive vehicle a normally operating system, i.e., either the E/C or D/C system, backs up a partner system when the latter malfunctions, i.e., the normal system executes a main control operation in place thereof to enable the vehicle to run safely for at least some minimal distance sufficient to obtain service.

Since such E/C and D/C systems are usually manufactured with an empty memory space provided in order to cope with later functional extensions or simply due to mass production considerations, there will usually be some extra unused memory area which can be used to store an interrupt program. Although neither the E/C nor D/C system can fully back the other system up, it is possible to alternatively execute the crucial functions of the other system at a reduced cost.

Although both systems perform complicated control jobs, relatively few functions are required to enable the vehicle to continue to a service station or repairing factory. In this case, other control capabilities may be reduced. Control functions necessary for maintaining the vehicle in the running state include, e.g., in the case of the E/C system 1000, fuel injection, ignition, and fuel pump actuation and in the case of the D/C system 2500, the speedometer (S/M) for indicating the vehicle speed and the odometer for indicating the history of vehicle travel.

The detailed description of the present invention is made hereinafter with reference to FIG. 1.

A signal denoted by 1041 is a pulse signal outputted when the E/C system 1000 operates normally and has a frequency (period) within a predetermined range. The pulse signal 1041 is outputted from the E/C system 1000 via the output interface thereof by an interrupt routine executed at predetermined intervals. The pulse signal 1041 is outputted from the E/C system 1000 via the output interface thereof after confirming the end of execution of the interrupt routine. A read or write signal outputted from the CPU 1300 into the Bus 1320 (See FIGS. 3(A) to 3(C)) can also be used as the pulse signal 1041. A pulse signal, similar to the signal 1041 described above is incorporated in UK patent application GB 2,035,633A which corresponds to U.S. Pat. No. 4,363,092. The D/C 2500 checks to see if the E/C sytem 1000 is operating normally on the basis of reception of the pulse signal 1041. Similarly, the E/C system 1000 checks to see if the D/C system is operating normally on the basis of reception of another pulse signal denoted by 2540 which has the same function as described above (1041).

The D/C system 2500 normally receives various input signals, performs various arithmetic and logic operations according to various series of instructions stored therewithin, and output various command signals according to the arithmetic and logic operation results. At the same time, the D/C system 2500 accepts the pulse signal 1041 from the E/C system 1000 to detect whether the frequency or period of pulse signal 1041 is within the predetermined range so as to check the operation of the E/C system 1000.

If the frequency falls within the predetermined range, the D/C system 2500 confirms that the E/C system is operating normally. Upon confirmation, the D/C system 2500 does not back up the E/C system 1000 but outputs the usual actuation signals 2542 and 2543 to respective actuating circuits 2523 and 2524 for the S/M 2527 and O/M 2528. The D/C system 2500, at this time outputs an "0" signal or "1" signal as normal operation flags to the actuating circuitry 1625 and 1626, in place of the actuation signals 2544 and 2545 for indicating that the D/C system is not performing its back-up functions. Similarly, the E/C system 1000 accepts the pulse signal 2540 from the D/C system 1000 to detect whether the frequency or period of the pulse signal 2540 falls within the predetermined range to monitor the operation of the D/C system 2500.

If the frequency (period) falls within the predetermined range, the E/C system 1000 confirms that the D/C system is operating normally. In this case, the E/C system 1000 also does not back up the D/C system 2500 but outputs the usual actuation signals 1511 and 1512. The E/C system 1000 similarly outputs an "0" signal or "1" signal to the actuating circuits 2523 and 2524 in place of the actuation signals 1548 and 1549.

If either of the pulse signals 1041 or 2540 does not fall within its predetermined range, the appropriate E/C or D/C system initiates marginal control functions necessary for safe operation of the vehicle, in addition to the usual control functions that the system provides or with the part of the usual control functions not necessary for safe operation of the vehicle halted.

The operation of the D/C system 2500 while performing EGI control when the E/C system 1000 fails will be described with reference to FIGS. 5(A) and 5(B).

Figure 5A:
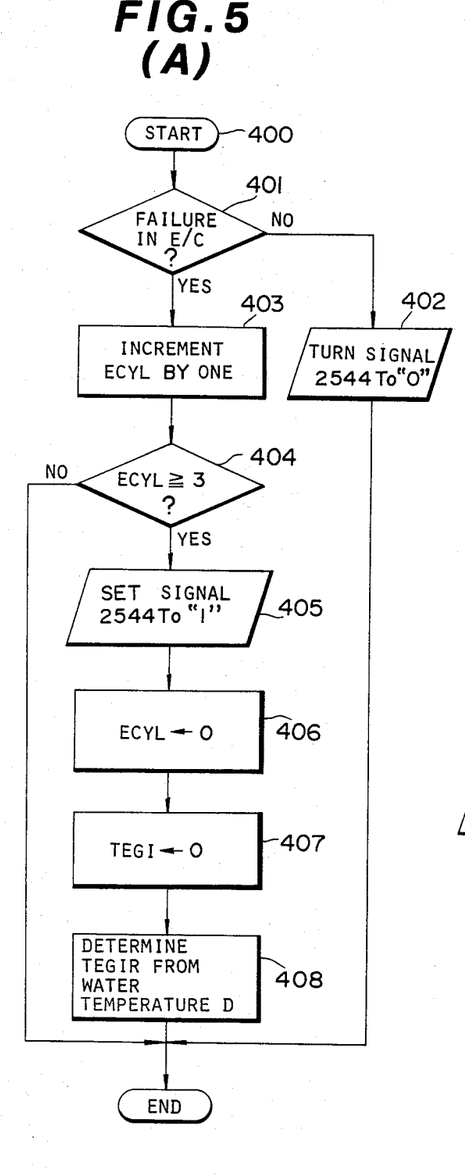
FIGS. 5(A) and 5(B) show examples of program flowcharts for executing fuel injection control in place of the engine control system shown in FIGS. 1, 2(B), or 3(A), 3(B), and 3(C) in the case when the engine control system fails.

The program based on the flowchart shown in FIG. 5(A) is executed whenever the engine crankshaft has rotated through a predetermined angle (in the case of a six-cylinder engine, the predetermined crankshaft rotational angle is 120°).

In step 401, the D/C system 2500 checks to see whether the E/C system 1000 is malfunctioning as indicated by signal 1041 as described hereinabove. If the D/C system 2500 ascertains that the E/C system 1000 is operating normally, the D/C system 2500 goes to step 402 to disable the output of the actuating signal 2544 and finishes the special routine shown in FIG. 5(A). If the D/C system 2500 determines that the E/C system 1000 is malfunctioning, the D/C system 2500 goes to step 403, wherein the D/C system 2500 increments the value ECYL representing the rotational position of the crankshaft. In step 404 the E/C system 1000 checks to see if the contents of data ECYL is greater than or equal to 3 (ECYL≧3). If less than 3, the D/C system 2500 finishes the special routine. If more than 3, program control goes to step 405, wherein the signal 2544 is set to "1" and sent to the actuating circuit 1625 to start fuel injection through the EGI circuitry 110. Subsequently, the D/C system 2500 resets the value of ECYL to "0". In other words, the ECYL is incremented by one whenever the engine has rotated through 120° and the ECYL is returned to zero whenever (ECYL)=3 (corresponding to one engine revolution). Therefore, the signal 2544 is outputted whenever the engine rotates through 360°. Next, in step 407 the value of TEGI is reset to zero, TEGI being used to count the interval of opening of fuel injection valves 10. In step 408, water temperature data is used to calculate a value TEGIR corresponding to the desired injection duration via a conventional look up table.

Figure 5B:
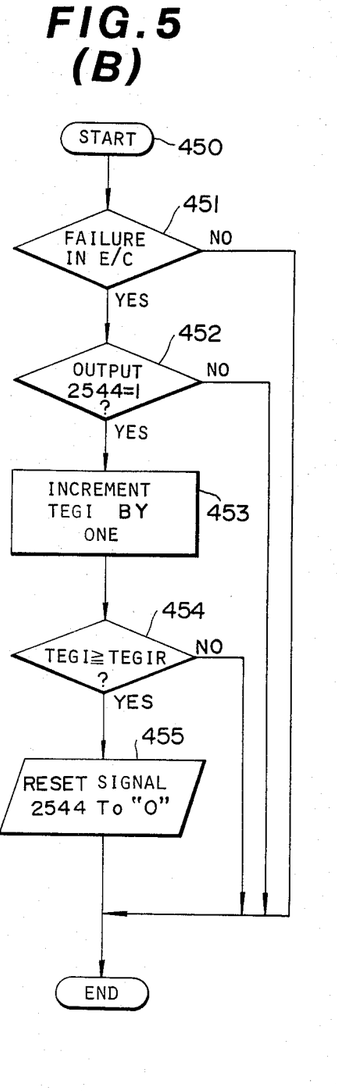

The program shown in FIG. 5(B) is repeatedly executed at a fixed time interval (e.g., 1 ms). In step 451, the D/C system 2500 checks whether the E/C system 1000 is operating normally. If not, in step 452, the D/C system 2500 checks whether the driving output of EGI 2544 is "1". If the output 2544 is "0", the 1-ms interrupt routine ends since the EGI drive has previously been completed.

On the other hand, if the output 2544 is "1", the D/C system 2500 continues the routine of FIG. 5(B) because fuel injection is in progress. First, in step 453, TEGI is incremented by one. The value of TEGI is reset whenever fuel injection is started as described hereinbefore and incremented every interrupt period (e.g., 1 ms). In step 454, the data of TEGI is compared with the data of TEGIR. If TEGI≧TEGIR, the driving output 2544 is reset to "038 and the D/C system 2500 ends the fuel injection routine. If TEGI<TEGIR, the fuel injection routine ends directly.

As described hereinabove, if the E/C system 1000 fails, a fuel injection pulse having a period of 1 ms and a width corresponding to the engine cooling water temperature is outputted whenever the engine rotates through 360°.

Figure 6:
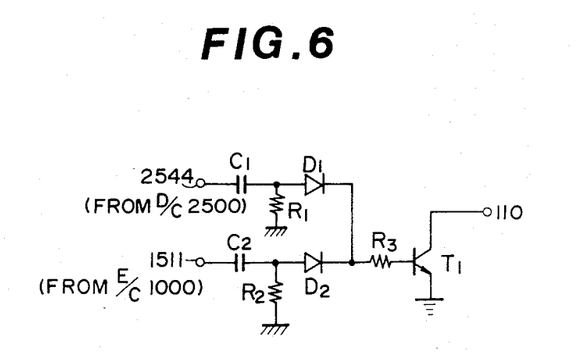
FIG. 6 is an internal circuit diagram of an actuating circuit 1625 shown in FIG. 1.

FIG. 6 shows a circuit configuration of the actuating circuit 1625.

In FIG. 6, the driving output signal 2544 from the D/C system 2500 is fed into a first capacitor $C_1$, first resistor $R_1$, and first diode $D_1$ which together constitute a positive-triggered pulse generator which fires at the leading edge of the driving output signal 2544 to turn on an injection valve actuating transistor $T_1$. On the other hand, the driving output signal 1511 from the E/C system 1000 is fed to a second capacitor $C_2$, second resistor $R_2$, and second diode $D_2$, which together constitute another positive-triggered pulse generator which fires at the leading edge of the driving output signal 1511 to turn on an injection valve actuating transistor $T_1$.

If the D/C system 2500 outputs a constant driving output 2544, the transistor $T_1$ is actuated only by the driving output 1511 from the E/C system 1000. If the E/C system 1000 outputs a constant driving output 1511, the transistor $T_1$ is in this case actuated only by the driving output 2544 from the D/C system 2500.

If the E/C system 1000 is operating normally, the driving output signal 1511 from the E/C system 1000 is normally fed to the actuating circuit 1625, with the driving output signal 2544 remaining at either "0" or "1", so as to actuate the transistor $T_1$. Fuel injection begins almost immediately after activation of the transistor $T_1$. It can be appreciated from the drawing that the EGI output portion 110 having a plurality of fuel injection valves is connected to the collector of the transistor $T_1$. If the E/C system 1000 fails and thus the driving output signal 1511 is disabled, the driving output signal 2544 from the D/C system 2500 will control the actuating circuit 1625 in place of the driving output signal 1511.

It should be understood that the E/C system 1000 backs up other control and display functions of the defective D/C system 2500 and that the D/C system 2500 backs up other necessary control functions as previously described.

For example, in the ignition control (IGI) section, power supply to the ignition coil 200 is interrupted so as to energize one of the plugs whenever the engine rotates through 120°. For the speed meter S/M and odometer O/M, the display actuation can be carried out by the E/C system 1000 in place of the defective D/C system 2500. Since the value of speedometer 2527 is calculated on the basis of the period or frequency of the vehicle speed signal 2534 and the value of the odometer is also calculated on a basis of the total pulse count of the vehicle speed signal 2534, the back-up programs for the speedometer 2527 and odometer 2528 can be initiated similarly to those shown in FIGS. 5(A) and 5(B). The circuit configuration of the actuating circuits 1626, 2523, and 2524 will be similar to that shown in FIG. 6. If the signals such as intake air flow quantity signal 21, start switch signal 261, idle switch on signal 271, and so on are also inputted into the D/C system 2500, more precise control of fuel injection can be achieved.

It is understandable that such back-up control can be executed by using extra, vacant memory. Since such back-up control programs perform only critical functions of vehicle operation, such back-up control may be performed by suspending control functions not necessarily required for safe vehicle operation. Such non-critical control functions include the above-described functions (3), (4), and (6) through (9) of the control functions of the E/C system 1000. Non-critical control functions of the D/C system 2000 include (1) through (6), (10), and (11). Either or both of the control systems 1000 and 2500 may interrupt non-critical normal functions in favor of critical back-up functions in accordance with the time requirements of the back-up functions in addition to normal critical functions.

An alternative method of checking to see whether the partner system (either E/C or D/C system) is operating normally is to detect whether one of the output signals from the partner system is normal. For example, the presence or absence of the EGI driving output 1511 from the E/C system 1000 may be determined from its period or frequency in order to monitor the operation of the E/C system 1000.

As described hereinabove, since multiple microcomputer systems for an automotive vehicle are provided, each having a capability to back up the main functions of the partner system when the latter fails, special back-up circuits are not needed and thus the manufacturing cost can be reduced. The contents of back-up program can be determined arbitrary so that the flexibility of back up control is enhanced.

It will be fully be understood by those skilled in the art that the foregoing description is in terms of preferred embodiment of the present invention wherein various changes and modifications may be made without departing from the spirits and scope of the present invention, which is to be defined by the appended claims.

What is claimed is:

1. An electronic data processing system mounted in an automotive vehicle, comprising:
    (a) a first microcomputer for performing engine control functions including primary control over primary engine functions including fuel injection start and duration, ignition timing, and fuel pump energization, and secondary control over secondary engine functions;
    (b) a second microcomputer for performing display control functions including primary control over primary indications including speedometer and odometer indications and secondary control over secondary vehicle driving indications;
    (c) first means provided within said first microcomputer for outputting to the second microcomputer a first signal for indicating whether said first microcomputer is operating properly;
    (d) second means provided in said second microcomputer for outputting to the first microcomputer a second signal indicating whether said second microcomputer is operating properly;
    (e) third means, provided in said first microcomputer and responsive to said second signal from said second means, for determining whether said second microcomputer is functioning properly;
    (f) fourth means, provided in said second microcomputer and responsive to said first signal from said first means, for determining whether said first microcomputer is functioning properly;
    (g) fifth means, provided in said first microcomputer and responsive to a negative determination by said third means, for enabling and causing said first microcomputer to assume at least said primary control over said primary indications from second microcomputer, with said first microcomputer additionally continuing to perform at least its primary control over primary engine functions; and
    (h) sixth means, provided in said second microcomputer and responsive to a negative determination by said fourth means, for enabling and causing said second microcomputer to assume at least said primary control over said primary engine functions from said first microcomputer, with said second microcomputer additionally continuing to perform at least its primary control over said primary indications.

2. A system as claimed in claim 1 wherein said first means enables and causes the first microcomputer to assume only said primary control over said primary indications, with said first microcomputer additionally continuing to perform only its primary control over said primary engine functions, and wherein said sixth means enables and causes the second microcomputer to assume only said primary control over primary engine functions, with said second microcomputer additionally continuing to perform only its primary control over said primary indications.

3. The electronic control system as set forth in claim 1, wherein said first and second signals have a frequency within a predetermined error range when said first and second microcomputers are functioning normally, respectively.

4. The electronic control system as set forth in claim 1, wherein said first and second signals have a predetermined frequency and wherein the fourth and third means are operable to determine whether the first and second microcomputers are functioning normally based on said predetermined frequency, respectively.

5. A method of operating an electronic control system for an automotive vehicle having two microcomputers respectively performing different vehicle control and monitoring functions, comprising the steps of:
    (a) outputting, directly from each microcomputer to the other microcomputer, a monitor signal indicative of whether the outputting microcomputer is malfunctioning;
    (b) monitoring the monitor signal outputted by each of said microcomputers with the other microcomputer, each of said microcomputers being operable to recognize whenever the other microcomputer is malfunctioning;
    (c) performing at least some functions of a malfunctioning one of said microcomputers with the other of said microcomputers whenever said one of said microcomputers is malfunctioning; and
    (d) executing steps (a) and (b) with both microcomputers concurrently.

6. The method of claim 5, wherein said step (c) comprises performing those functions of the malfunctioning microcomputer which are necessary for continued, safe operation of the vehicle by using the other microcomputer with said other computer continuing to perform its normal functions.

7. The method of claim 5, wherein said step (c) comprises performing those functions of the two microcomputers which are necessary for continued, safe operation of the vehicle by using the other microcomputer.

8. The method of any one of claims 5, 6, or 7, wherein each microcomputer executes a control program at intervals which fall within a predetermined range, and said step of outputting further comprises outputting said monitor signal at the end of the control program each time the program is executed, and the step of monitoring further comprises monitoring a period of said monitor signal and recognizing a malfunction whenever the period of said monitor signal does not fall within said predetermined range.

* * * * *